(No Model.)
M. E. ARENDT & A. L. WEIL.
PROCESS OF OBTAINING LUBRICATING OIL FROM CRUDE PETROLEUM
No. 278,844.                  Patented June 5, 1883.
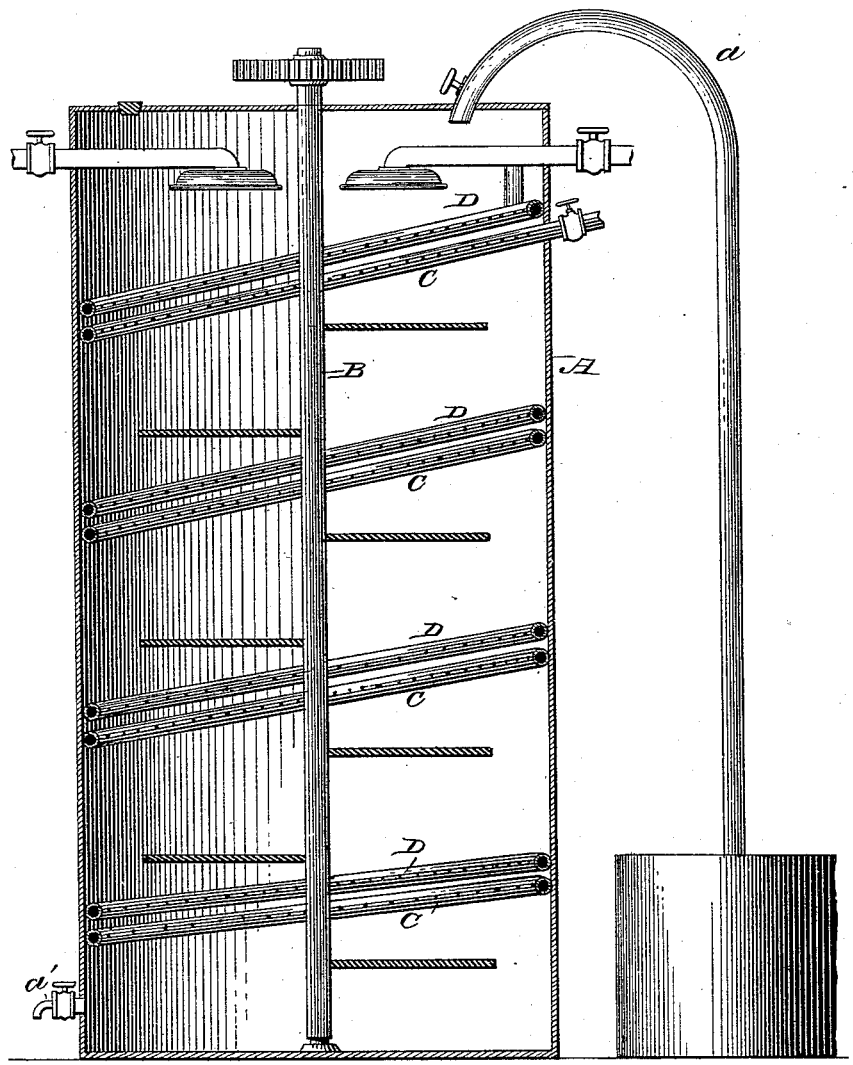

United States Patent Office.

MARTIN E. ARENDT, OF BUFFALO, NEW YORK, AND A. LEO WEIL, OF BRADFORD, PENNSYLVANIA.

PROCESS OF OBTAINING LUBRICATING-OIL FROM CRUDE PETROLEUM.

SPECIFICATION forming part of Letters Patent No. 278,844, dated June 5, 1883.

Application filed November 24, 1882. (No model.)

*To all whom it may concern:*

Be it known that we, MARTIN EDWARD ARENDT and A. LEO WEIL, citizens of the United States, and residents, respectively, of Buffalo, in the county of Erie and State of New York, and of Bradford, in the county of McKean and State of Pennsylvania, have invented certain new and useful Improvements in Processes of Obtaining Lubricating-Oil from Crude Petroleum, of which the following is a specification.

In the accompanying drawing is shown one form, in vertical section, of an apparatus for employing our method, in which—

A is a tank having a tube, $a$, for the escape of vapors, and also a drawing-off cock, $a'$. B is an agitator or stirrer stepped in the bottom of the tank A, and having a gear-wheel by which it can be revolved. C is a perforated steam-pipe, coiled around the inner side of the tank A. D is a perforated cold-water pipe, coiled within the tank A. Both pipes have suitable cocks for regulating the admission of the steam and water.

This present application has reference only to our improved process or method, as we prefer to make the apparatus the subject of another application.

We fill the tank A about one-third full with a mixture of crude oil and water, generally about equal parts of each, but the relative proportions are not material. We then thoroughly agitate and mix the oil and water, and heat the agitated mixture to a little less than the boiling-point of water, or thereabout. A convenient and ready way of heating it is by steam introduced by the perforated steam-pipe C. The force of the escaping steam also aids in agitating and mixing the oil and water, and thus the oil is subdivided into minute particles. The volatile portions of the oil are driven off and escape through the pipe $a$ into a suitable condenser. When the evaporation has continued sufficiently the steam is shut off; but the agitation of the liquid is still continued. The cold-water pipe is opened and the mixture is quickly flooded with cold water, so as to chill the oil. As paraffine solidifies at a much higher temperature than the lubricating-oil does, and as in its agitated state it is very finely divided, the introduction of the cold water causes it to congeal, and while congealing it entangles all dirt, sand, grit, and other impurities, and the water dissolves and absorbs all the soluble ingredients. The motion of the agitator is stopped, the current of water shut off, and the liquid drawn off into a settling-tank. The water will sink to the bottom, the paraffine and entangled impurities will float upon the water, and the cleansed and purified lubricating-oil will occupy the upper portion.

The success of our method will be best assured by the degree to which the crude oil is subdivided, and while it is in the state of the minutest practicable subdivision as quickly as possible, chilling each globule to below the congealing-point of paraffine.

We are aware that oils have been separated from impurities by agitating them with heated water by currents of air, allowing the hot water to settle, replacing it with cold water, and again agitating the mixture; but we consider it essential, as well as a great saving of time, to not allow the mixture to rest after the agitation has been commenced, and in that method the required change of temperature cannot be effected as quickly as we consider necessary. We are also aware that paraffine-oil evolved by the destructive distillation of coal has been congealed by passing it through a refrigerating apparatus, that crude paraffine has been separated from its impurities by agitating it with water or solvents placed in a tank having means for keeping it cool, and that steam has been used to melt paraffine, which, after melting, is slowly agitated and treated with cold water, and these we do not claim; but

What we claim as our invention is—

A method or process of obtaining lubricating-oil from crude petroleum, which consists in mixing the crude oil with water, heating the mixture to a little less than the temperature of boiling water, violently agitating it, and thus driving off the lighter vapors, and admitting cold water directly into the mixture while it is in a state of violent agitation, whereby the paraffine is suddenly congealed, and the undissolved impurities entangled therein, substantially as described.

MARTIN EDWARD ARENDT.
A. LEO WEIL.

Witnesses:
HENRY E. ROEDER,
B. D. V. REEVE,
W. D. TENNY.